United States Patent [19]
Zelley et al.

[11] Patent Number: 5,173,903
[45] Date of Patent: Dec. 22, 1992

[54] METHOD FOR PERFORMING QUALITY LOGIC TESTS ON DATA PROCESSING SYSTEMS BY SEQUENTIALLY LOADING TEST MICROINSTRUCTION PROGRAMS AND OPERATING MICROINSTRUCTION PROGRAMS INTO A SINGLE CONTROL STORE

[75] Inventors: Richard C. Zelley, Chelmsford; Elmer W. Carroll, Billerica, both of Mass.

[73] Assignee: Bull HN Information Systems Inc., Billerica, Mass.

[21] Appl. No.: 583,741

[22] Filed: Sep. 14, 1990

[51] Int. Cl.⁵ .............................................. G06F 11/00
[52] U.S. Cl. .............................. 371/16.1; 364/267.1; 364/267.4; 364/280.2; 364/DIG. 1; 395/575
[58] Field of Search ................. 371/16.1; 395/575; 364/267.1, 267.4, 280.2

[56] References Cited

U.S. PATENT DOCUMENTS

| | | | |
|---|---|---|---|
| 4,127,768 | 11/1978 | Negi et al. | 371/16.1 |
| 4,334,307 | 6/1982 | Bourgeois et al. | 371/16.1 |
| 4,499,581 | 2/1985 | Miazga et al. | 371/16.1 |
| 4,837,764 | 6/1989 | Russello | 371/16.1 |

*Primary Examiner*—Charles E. Atkinson
*Attorney, Agent, or Firm*—Gary D. Clapp; John S. Solakian

[57] ABSTRACT

A method for performing initial testing of a system wherein, in response to power on of the system, the control store of a central subsystem is loaded with a testing microinstruction program for internal testing of the central subsystem and the testing program executed. Upon completion of the testing program, the central subsystem operating programs are loaded into the control store, and control of the data processing system is transferred to the system programs.

6 Claims, 4 Drawing Sheets

METHOD FOR PERFORMING QUALITY LOGIC TESTS ON DATA PROCESSING SYSTEMS BY SEQUENTIALLY LOADING TEST MICROINSTRUCTION PROGRAMS AND OPERATING MICROINSTRUCTION PROGRAMS INTO A SINGLE CONTROL STORE

CROSS REFERENCES TO RELATED PATENT APPLICATIONS

The following patent applications and patents which are assigned to the same assignee as the present patent application have related subject matter:

1. Data Processing System Having a Bus Command Generated by One Subsystem on Behalf of Another Subsystem, invented by George J. Barlow, Arthur Peters, Richard C. Zelley, Elmer W. Carroll, Chester M. Nibby, Jr., and James W. Keeley, Ser. No. 944,052 filed Dec. 18, 1986 and now abandoned.

2. Apparatus and Method of Loading A Control Store Memory of a Central Subsystem, invented by Richard C. Zelley, Mark J. Kenna, Jr., and Wallace A. Martland, Ser. No. 943,980, filed Dec. 18, 1986 and issued Apr. 3, 1990 as U.S. Pat. No. 4,914,576.

3. Apparatus and Method for Loading and Verifying A Control Store Memory of a Central Subsystem, invented by Chester M. Nibby, Jr., Richard C. Zelley, Kenneth E. Bruce George J. Barlow, and James W. Keeley, Ser. No. 943,984, filed Dec. 18, 1986 and issued Mar. 20, 1990 as U.S. Pat. No. 4,910,666.

4. Apparatus and Method of Loading Different Control Stores of a Multiprocessor to Provide a Multi-Personality System, Invented by Richard C. Zelley, Mark J. Kenna, Jr., and Wallace A. Matland, Ser. No. 943,985, filed Dec. 18, 1986.

5. Universal Peripheral Controller Self-Configuring Bootloadable Ramware, invented by John A. Klashka, Sidney L. Kaufman, Krzysztof A. Kowal, Richard P. Lewis, Susan L. Raisbeck and John L. McNamara, Jr., Ser. No. 925,431, filed Oct. 31, 1986 and issued Feb. 7, 1989 as U.S. Pat. No. 4,803,623.

6. System Management Apparatus for a Multiprocessor System, invented by George J. Barlow, Elmer W. Carroll, James W. Kelley, Wallace A. Martland, Victor M. Morganti, Arthur Peters and Richard C. Zelley, Ser. No. 869,164, filed May 30, 1986 and continued as Ser. No. 377,785, filed Jul. 6, 1989.

The following patent is assigned to Honeywell Information Systems Inc. and has related subject matter:

1. Multiprocessor Shared Pipeline Cache Memory With Split Cycle and Concurrent Utilization, invented by James W. Keeley and Thomas F. Joyce, application Ser. No. 655,473, filed Sep. 27, 1984 and issued Sep. 22, 1987 as U S. Pat. No. 4,695,943.

BACKGROUND OF THE INVENTION

Field of Use

The present invention related generally to the testing of data processing systems and, more particularly, to an improved method for testing the logic circuits of a data processing system at system initialization.

Prior Art

In many data processing systems of the prior art, it is common to have the system perform a series of self test programs to detect faults or errors in the operation of the system, and, in particular to perform test of the system hardware elements. This is commonly performed, at system initialization, or power on, by loading the control store memory of a system central processing unit with the central processing unit's normal operating programs, that is, the microinstruction operating programs which control the detailed operations of the central processor in response to applications program and operating system instructions, and one or more testing programs. The testing programs are then executed, frequently using the programs included in the central processor's microinstruction operating programs, and control of the system turned over to the system programs, that is, the operating system and applications programs, after testing is completed.

A recurring problem in testing the system arises, however, from the limited memory capacity of the central processor's control store in that both the central processor's microinstruction operating programs and the testing programs are resident in the control store, both at system initialization and during system operation.

This limitation means that the control store space devoted to testing programs must be severely restricted in order to have adequate control store room for the operating programs. In a typical situation, the testing programs may be limited to no more than 5 to 10 percent of the control store memory space.

As the hardware of the data processing systems grows more complex, however, both the space needed for adequate testing programs increases and the size of the operating programs increases. In a typical example of this problem, a particular system existed in two versions, one being more complex and powerful than the other. The increased complexity of the upgraded system hardware required an increase in 20% in the size of the testing programs to obtain an adequate level of assurance in the system tests. The increased size of the operating programs, however, required a reduction of only 1% in the control store space allocated for test programs. This reduction of 1% in the space permitted for the testing programs resulting in a 10% reduction in the confidence level in the test results, which was considered unacceptable. Although the size of the control store could be increased, this approach is expensive, and may not be feasible in upgrading an existing system.

OBJECTS OF THE INVENTION

It is therefore an object of the present invention to provide an improved method for performing initial testing of a data processing system.

It is a further object of the present invention to provide an improved method for performing initial test of the data processing system with increasing the size of the system control store.

SUMMARY OF THE INVENTION

In the present invention, a data processing system is comprised of a plurality of functional units for performing data processing operations. The functional units include a memory for storing programs, a central subsystem comprised of a central processing unit for performing data processing operations and a control store responsive to the programs for storing and providing microinstructions for controlling the central processing unit. A system bus is provided for communicating information the functional units of the system.

The present invention provides a method for performing initial testing of the system wherein, in response to power on of the system, the control store of a central subsystem is loaded with a testing microinstruction program for internal testing of the central subsystem and the testing program executed. Upon completion of the testing program, the central subsystem operating programs are loaded into the control store, and control of the data processing system is transferred to the system programs.

In a present embodiment of the present invention, the system further includes a system manager unit connected from the system bus for performing system management functions. The system manager includes a memory for storing programs for controlling certain operations of the system units, including the loading of microinstruction programs into the control store and self test programs for the system manager, and a central processing unit responsive to the system management programs for performing system management operations. The system manager, in turn, performs an internal self test at system initialization, or power on, and performs tests of those elements of the system function units which are accessible from the system bus. The system manager further controls the loading of the control store with the testing programs, the execution of the testing programs, and the loading of the control store with the central subsystem operating program after completion of the tests.

This improved method for performing initial test of a data processing system offers significant advantages over the methods of the prior art. For example, the control store space which may be used for test programs is essentially the entirety of the memory space in the control store, thereby allowing substantially increased testing of the system. In the previously discussed system, for example, an increase in the test programs of only 5% to 7% resulted in a 10% increase in the confidence level in the results of the testing.

In addition, and because the test programs are not permanently resident in the control store, and not constrained by the space required for the operating programs, the testing programs may be more easily updated, extended and modified.

The present invention also is an advantage to the operating programs of the system in that, only a very small portion of the control store may be reserved for test and system control programs, for example, 1% or less, rather than up to 10% as in systems of the prior art. The operating programs therefore have more available control store space and may be more easily expanded, extended and modified.

Finally, and because the testing programs now control the operations of the central subsystem directly, rather than operating through or with the operating programs, the testing operations may be executed at higher speed.

BRIEF DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF A PREFERRED EMBODIMENT

Figure 1:
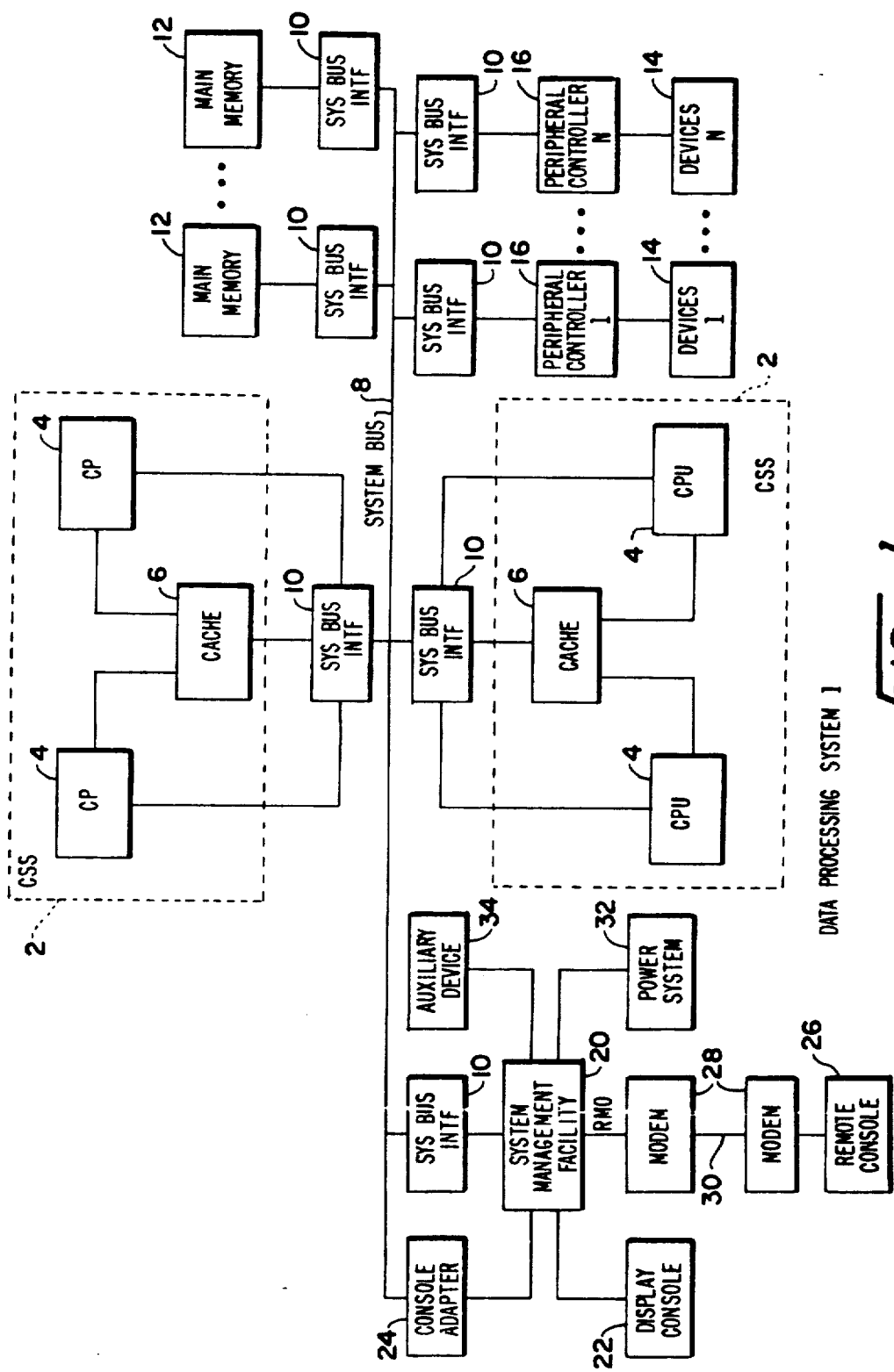
FIG. 1 is a block diagram of an exemplary system incorporating the present invention.

Referring to FIG. 1, therein is represented a block diagram of an exemplary system in which the present invention may be embodied. Data Processing System (DPS) 1 may be, for example, a DPS 6000, Model 400 or Model 600 computer system from Bull HN Information Systems Inc. of Billerica, Mass. The following will describe the structure and operation of DPS 1 only briefly as such systems are generally well known and understood in the art and the exemplary system described specifically herein is described in detail in the previously referenced related patents.

As shown, multiprocessor Data Processing System (DPS) 1 includes a one or more functional units, including one or more Central Sub-Systems (CSSs) 2, each CSS 2 being comprised of a pair of independently operating Central Processors (CPs) 4 sharing access to a Cache 6. Each CP 4 and the Cache 6 of each CSS 2 have access to a System Bus 8 through a System Bus Interface (SBI) 10.

DPS 1's functional units further include one or more Main Memories 12, which are shared by the CSSs 2 and which are each connected to System Bus 8 through a SBI 10, and one or more Peripheral Devices (PDs) 14, such as disk and tape drives and communications devices. Each PD 14 is connected to System Bus 8 through a SBI 10 and an appropriate corresponding Peripheral Device Controller (PDC) 16.

Finally, DPS 1's functional units include a System Management Facility (SMF) 20 with associated system management devices. SMF 20 provides centralized control of DPS 1. Among the operations controlled by SMF 20 are initialization of the DPS 1 system, initialization and control of Quality Logic Testing, that is, system fault testing and detection, and loading of operating system and applications software into Main Memories 12 and CPUs 2. SMF 20 also controls certain overall system operations, including system timing, monitoring of errors and faults, and monitoring of system operating temperature and system power.

Associated with SMF 20 are a Display Console 22 connected to SMF 20, which allows direct communication between a user and DPS 1, and a Console Adapter 24 which provides communication between Display Console 22 and System Bus 8 through SMF 20. Communication between a remote user and DPS 1, for example, for remote diagnostics, may be provided in the same manner as Display Console 22 through a Remote Console 26, which is connected to SMF 20 through Modems 28 and a Communications Link 30. Finally, SMF 20 includes a connection to Power System sensors and controllers 32 and to such Auxiliary Devices 34 as a printer.

Figure 2:
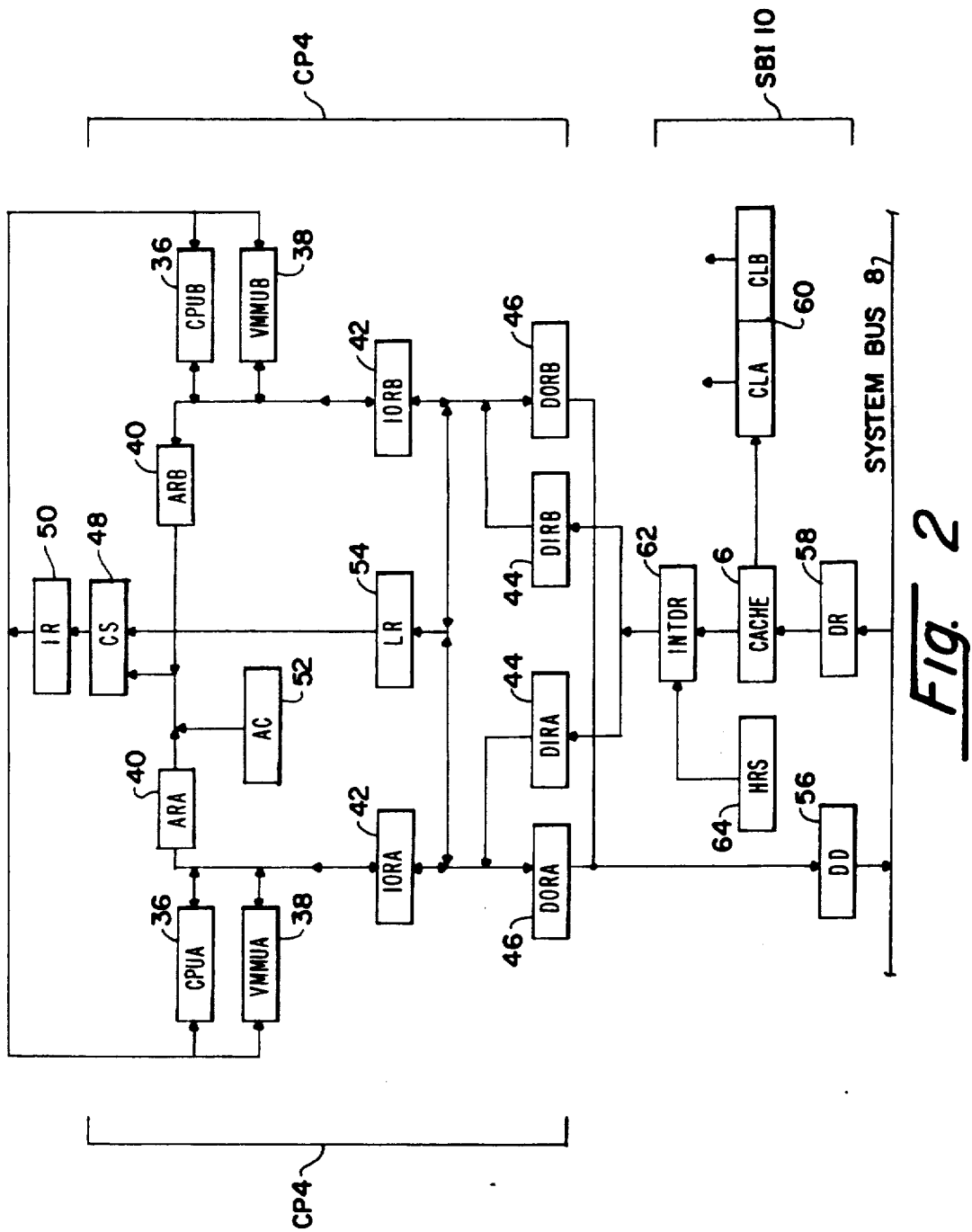
FIG. 2 is a block diagram of a central subsystem of the exemplary system.

Referring to FIG. 2, therein is represented a simplified block diagram of a CSS 2 with those portions of a CSS 2 comprising CPs 4 and SBI 10 being generally indicated by brackets.

First considering the CPs 4, each CP 4 of a CSS 2 contains data processing elements which are specific to the CP 4, while certain processing control elements of the CSS 2 are shared between the CP 4's. In particular, each CP 4's processing elements which include a Central Processing Unit (CPU) 36 with an associated Virtual Memory Management Unit (VMMU) 38, an Address Register 40, and a data Input/Output Register (IOR) 42. As is well understood in the art, the CPU 36s perform the actual data processing operations under control of microinstruction programs, frequently referred to as microcode programs, or routines, provided from the control elements of a CSS 2 in response to applications program or operating system instructions provided from the MM 12s. The VMMU 38s manage and control memory related operations, such as the reading and writing of data and programs from and to the MM 12s.

Each CP 4 also has a Data Input Register (DIR) 44 and a Data Output Register (DOR) connected to SBI 10 and to CSS 2's Cache 6 for the transfer of data into and out of the CP 4s and the reading of program instructions from the MM 12s to the CSS 2. Cache 6 is shown as associated with the SBI 10, but may also be regarded as associated with the two CP 4s of CSS 2.

For clarity of representation, the data processing elements of the two CP 4s are respectively designated by the addition of the suffix A to the element designations. That is, the CPU 36s of the two CP 4s are designated as CPUA 36 and CPUB 36, the VMMU 38s as VMMUA 38 and VMMUB 38, and so on.

As the function and operation of processing elements such as CPUs 36, VMMUs 38, ARs 40, IORs 42, DIRs 44 and DORs 46 and well known and understood by those of ordinary skill in the art, these elements will not be discussed in further detail herein. In addition, these elements of the exemplary system are well described in the previously referenced related patents.

The elements shared between the CP 4s comprise the elements controlling the operations of the two CP 4s and include the Control Store (CS) 48. CS 48 is used to store the operating microinstruction programs, or routines, controlling the detailed operations of the two CPs 4 in response to higher level instructions, for example, of the applications programs and operating system.

An Instruction Register (IR) 50 is associated with CS 48 to provide the microinstructions from CS 48 to the processing elements of the two CPs 4. As described in the previously referenced related patents, the two CPs 4 share the microcode routines stored in CS 48. In an alternate embodiment of DPS 1, however, also described in the related patents, each CP 4 could have its own control store, instruction register, and related elements. The modifications to a CSS 2 to use either a single, unified control store or separate control stores will be well understood by those skilled in the art, in particular after reference to the related patents.

The shared control elements also include an Address Counter (AC) 52, which is used to generate sequential addresses for reading sequences of microinstructions from the microinstruction programs stored in CS 48 or in loading the microinstruction programs into CS 48, and a Load Register (LR) 54, which is used in writing microcode routines into the CS 48 through the SBI 10. As described above in association with CS 48, these elements could be separate for the two CPs 4 in alternate embodiments of DPS 1.

Again, the functions and operations of these processor control elements are both well understood by those familiar with the art and described in detail in the referenced related patents.

Referring to the SBI 10 related portions of the CSS 2, an SBI 10 includes Data Drivers (DDs) 56, comprised of line drivers, for transferring information from DDRs 46 from CPs 4 to System Bus 8 and Data Receivers (DRs) 58, comprised of line receivers, for receiving information from System Bus 8. In the exemplary system illustrated herein, the outputs of DRs 58 are connected into Cache 6. In alternate embodiments, the element shown as Cache 6 may be implemented as a set of registers for receiving the data and instructions from System Bus 8, or a set of registers arranged as a First-In-First-Out (FIFO) memory, rather than as a full cache.

Cache 6 in turn provides outputs to Control Logic (CL) 60, which comprised of Control Logic A (CLA) 60 and Control Logic B (CLB) 60. CLA 60 and CLB 60 respectively provide control functions to the two CPs 4, for example, to control the loading of Control Store 48. Cache 6 also provides outputs to Interrupt and Data Registers (INTDR) 62, which in turn provides data, interrupt commands and instructions received from System Bus 8 and through Cache to DIRA 44 and DIRB 44 of the CPs 4.

Finally, associated with INTDR 62 is a Hardware Revision Store (HRS) 56 for storing information identifying the particular revision or configuration of the hardware comprising the CSS 2. As is described in the referenced related patents, this information is read from the HRS 56 of the CSS 2 by SMF 20 at system initialization. SMF 20, as described in the referenced patents, controls the initial loading of programs into the CSSs 2 of DPS 1, such as loading microcode programs into CS 48.

Again, the functions and operations of the above described elements of the CSS 2 are both well understood by those familiar with the art and, for the exemplary system described herein, are described in detail in the referenced related patents.

Figure 3:
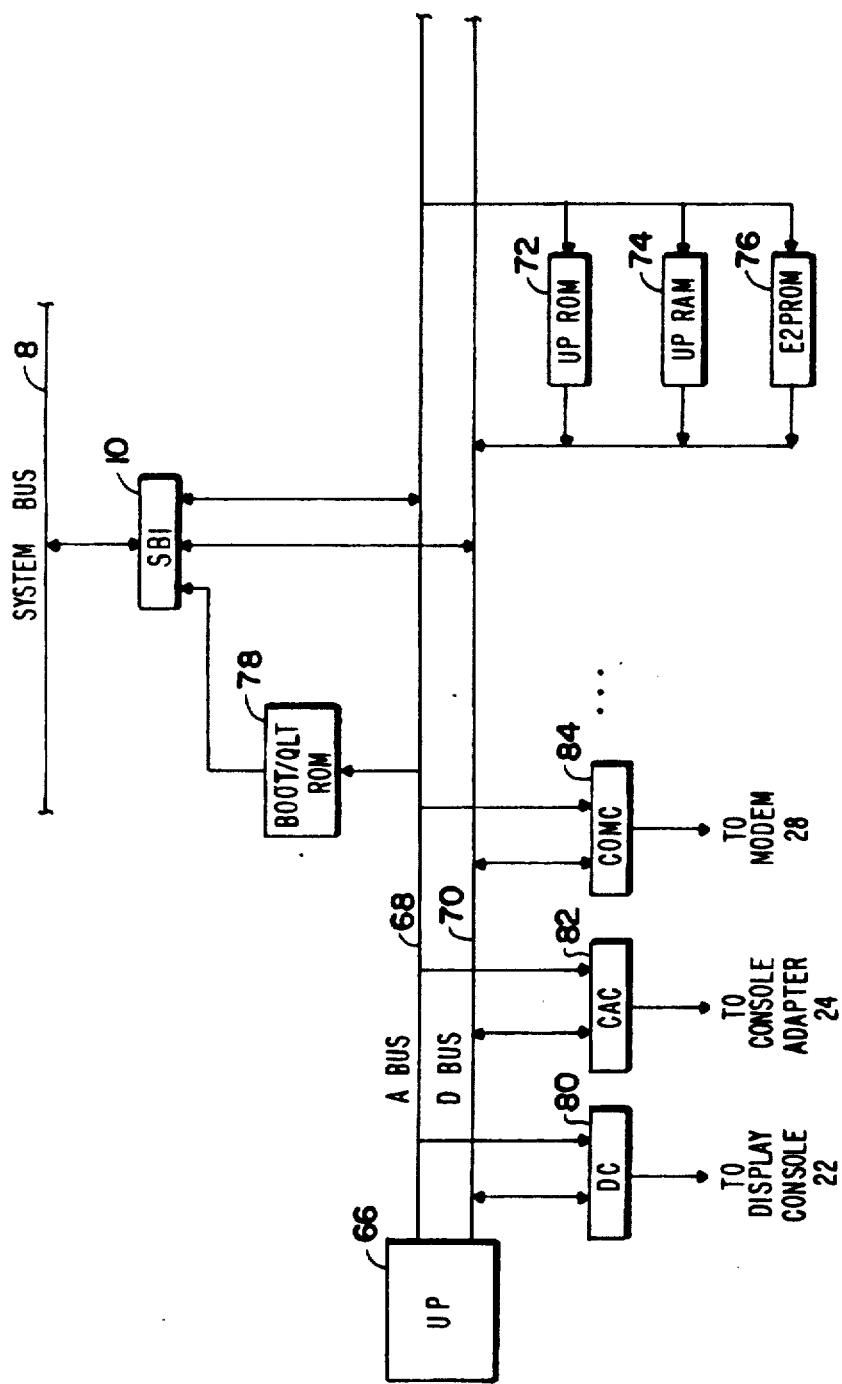
FIG. 3 is a block diagram of a system manager of the exemplary system.

Referring to FIG. 3, therein is presented a simplified block diagram of SMF 20. As shown, SMF 20 is essentially a general purpose central processing unit executing programs designed to perform specialized functions. Among these functions are system initialization and test, including the initial loading of microcode routines into the CS 48s of the CSS 2s and the loading of Quality Logic Test (QLT) programs into the MM 12s and the execution of such QLT programs to test the proper operation of DPS 1 and detect errors or faults in the operations of the CSS 2s, MM 12s and other elements of DPS 1.

SMF 20 includes a Microprocessor (UP) 66, which controls and performs the operations of SMF 20 under direction of programs stored in SMF 20's memory elements, and an Address Bus 68 and a Data Bus 70 connecting UP 66 and the other elements of SMF 20 for communication of data and instructions among the element of SMF 20.

The memory elements of SMF 20 include a Microprocessor Read Only Memory (UPROM) 72, which stores the programs directly controlling UP 66, that is, UP 66's microcode routines. Data used by and generated SMF 20 and certain programs controlling the operations of SMF 20 are stored in a Microprocessor Random Access Memory (UPRAM) 74, as is typical in most computer systems.

An Electronically Erasable Programmable Read Only Memory (E2PROM) 76 is provided for long term storage of certain programs and information which are to be permanently resident in SMF 20, unless deliberately erased or overwritten by the system user. Such programs would include the initialization program, or bootload program, for SMF 20, passwords and password programs for controlling access to DPS 1 and AMGF 20, information identifying the Peripheral Device 14 storing the system initialization (boot) software, MM 12 locations assigned for specific functions, such as storing boot and QLT programs, information as to which test programs are to be executed and the results to be expected from such programs, and information as to which of Peripheral Devices 14 contain the programs or microcode for controlling CSS 2s. E2PROM 76 will also store and provide test programs for the self test of SMF 20, the testing of System Bus 8, and testing of various device's interfaces with System Bus 8, such as the SBI 10 of CSS 2, and such elements as CSS 2's Cache 6, DIR 44s and DORs 46, all of which are accessible from System Bus 8 and which perform functions related to the transfer of information to and from System Bus 8.

Finally, a Boot and QLT Read Only Memory (BOOT/QLT ROM) 78 is provided to store programs for controlling operation of DPS 1 during initialization, such as a programs for controlling the initial loading, or booting, of software into DPS 1 and for selecting QLT programs to be executed at system initialization.

SMF 20 also includes a number of device controllers for controlling the peripheral devices of SMF 20, such as a Display Controller (DC) 80 for interfacing SMF 20 with Display Console 22, a Console Adapter Controller (CAC) 82 for interfacing SMF 20 to Console Adapter 24, and a Communications Controller (COMC) 84 for interfacing SMF 20 with Modem 28.

Finally, the elements of SMF 20 are connected, through A Bus 68 and D Bus 70, to System Bus 8 through an SBI 10. BOOT/QLT ROM 78 which, as described, stores programs for controlling the initialization and testing of other elements of DPS 1, such as the CSS 2s and MEM 12s, is connected directly through SBI 10 to System Bus 8.

Again, SMF 20 will not be described in further detail as the general structure and operation of such elements in a system, are, in general, well known in the art and are described in detail in the referenced related patents.

Figure 4:
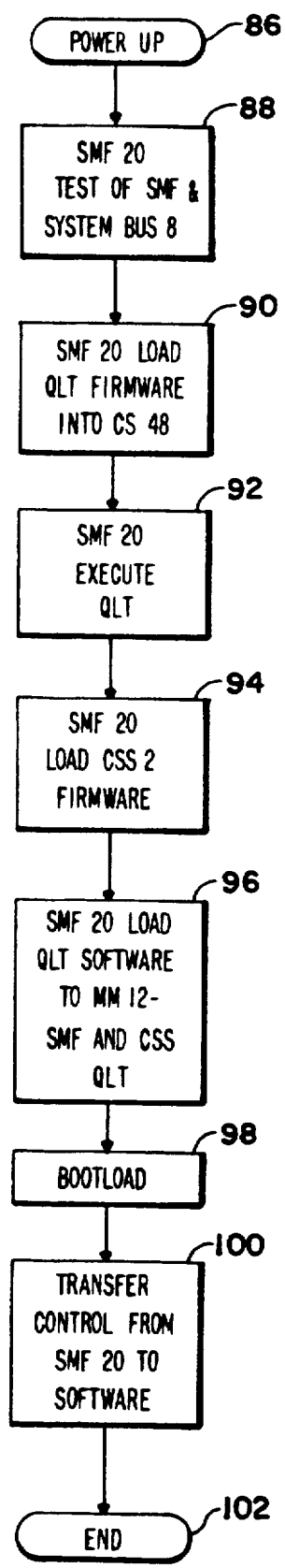
FIG. 4 is a flow chart of the method of the present invention.

Referring to FIG. 4, therein is illustrated the method of the present invention for performing QLT (Quality Logic Test) operations at system initialization. It should be noted that many of the detailed test operations referred to herein are well known in the art and, in the case of the exemplary system discussed herein, are described in detail in the previously referenced related patents.

As shown in FIG. 4, the first step of the QLT method is Step 86, wherein power is provided to the system, which initiates Step 88. In Step 88, SMF 20 is initialized by the bootload programs stored in E2PROM 76. The bootload programs in turn initiate the execution of a series of test programs stored in E2PROM 76; these E2PROM 76 test programs include routines for self test of SMF 20 and System Bus 8 test programs which test System Bus 8 and the interface between System Bus 8 and SMF 20 by writing information from SMF 20 to System Bus 8 and reading the test information back from System Bus 8.

The E2PROM 76 test programs performed in Step 88 further include routines for testing the interfaces between each of DPS 1's devices, such as each CSS 2 and each MM 12, and System Bus 8. These QLT routines will test such elements as each CSS 2's Cache 6, DIR 44s and DORs 46, and all elements of the system which are accessible from System Bus 8. Such elements are primarily concerned with functions related to the transfer of information to and from System Bus 8. Again, these test are generally of the wrap-around type, wherein information, such a test pattern of bits, is written from SMF 20 and through System Bus 8 to the element of the system device being tested, such as a CSS 2's Cache 6, and read back to SMF 20 from the element being tested. As stated above, in addition to the CSS 2 elements interfacing with System Bus 8, these test routines will perform similar tests on those elements of each of the MM 12s and Peripheral Controller 16s that are accessible to SMF 20 through System Bus 8.

In Step 90, SMF 20, operating under control of further routines stored in E2PROM 76, will load QLT microinstruction programs for testing the internal logic elements of the CSS 2s from a storage device, such as a disk drive connected as a Peripheral Device 14, and into the CS 48 of each CSS 2. As described in the Summary of the Invention, only the QLT internal testing programs are loaded into the CS 48s at that time, not, as in systems of the prior art, both QLT test programs and the CSS 2 operating microinstruction programs. It should be noted that the QLT test programs are programs of microinstructions directly executable by the elements of CSS 2 and comprise a set of sequences of microinstructions which, when executed by CSS 2, test the operation of the internal elements of CSS 2.

In Step 92, which is initiated by SMF 20 after the CSS test routines have been loaded into the CS 48s of the CSS 2s, each CSS 2 will execute the internal self test programs stored in its CS 48. These programs will test, for example, the operation of the CPU 36's and VMMU 38's, Cache 6 at full speed, the internal logic of SBI 10, and the internal registers and data and address paths of each CSS 2, such as the IR 50s, the AR 40s, AC 52 and LR 54, the IOR 42s, and so on. It should be noted that such tests are generally known to those of ordinary skill in the art and, in the instance of the particular exemplary system described herein, are further described in the previously referenced related patents.

In Step 94, and after the completion of the CSS 2 internal QLT test programs in Step 92, SMF 20 will cause the CSS 2 normal operating firmware to be loaded into the CS 48 of each CSS 2. While SMF 20 may cause the QLT internal test routines stored in the CS 48s in Step 90 to be erased before loading the normal operating microcode, it will be more usual for the normal operation microcode to simply be written over the previously stored QLT test routines. The CSS 2s are then ready to execute the instructions of applications programs and the operating system.

In Step 96, SMF 20 will load MM 12's with further QLT programs, in particular QLT programs for performing further tests on DPS 1 under the direct control of the system operator, and system management programs used by SMF 20 in the overall control and monitoring of DPS 1. These programs will usually be stored in a Peripheral Device 14, such as a disk drive. DPS 1 may then execute these QLT routines under operator control, thereby completing all QLT testing of the system.

In Step 96, SMF 20 will initiate and execute the bootload of DPS 1, in particular the loading of MM 12s with DPS 1's operating system read from a Peripheral Device 14, such as a disk drive. In Step 100, SMF 20 then turns control of DPS 1 over to the system programs loaded into the MM 12s, such as the operating system and applications programs, and the test procedure ends with completion of all QLT operations and the system ready for operation at Step 102.

While the invention has been particularly shown and described with reference to a preferred embodiment of the method thereof, it will be understood by those of ordinary skill in the art that various changes in form, details and implementation may be made therein without departing from the spirit and scope of the invention as defined by the appended claims.

What is claimed is:

1. In a data processing system comprised of a plurality of functional units for performing data processing operations, including a memory for storing system programs, a central subsystem comprised of a central processing unit for performing data processing operations and a control store responsive to the programs for storing and providing microinstructions for controlling the central processing unit, means for storing a testing microinstruction program for testing the central subsystem and central subsystem operating microinstruction programs, and a system bus for communicating information among the functional units of the system, a method for performing initial testing of the system, comprising the steps of:
   1) in response to power on of the system, loading the control store of the central subsystem with only the testing microinstruction program for testing the central subsystem,
   2) in the central subsystem and responsive to the testing microinstruction program, executing the testing microinstruction program to detect faults in the central subsystem,
   3) responsive to the completion of the testing program, loading only the central subsystem operating microinstruction programs into the control store in replacement of the testing microinstruction program, and
   4) transferring control of the data processing system to the system programs, so that,
      only the testing microinstruction program is resident in the central subsystem during system initial testing, and
      only the operating microinstruction programs are resident in the central subsystem control store during execution of the system programs.

2. The method of claim 1 for performing initial testing of the system wherein the system further includes a system manager unit connected from the system bus for controlling system management operations of the functional units of the data processing system, the system manager unit including a memory for storing programs for controlling operations of the system manager unit, the programs stored in the system manager unit memory including self test programs for self test of the system manager, and a system manager processing unit responsive to the programs stored in the system manager unit memory for performing the operations directed by the programs stored in the system manager unit memory, wherein step 1 further comprises the step of:
   in the system manager, and responsive to power on of the system and to the system manager self test programs,
   1A) performing an internal self test of the system manager.

3. The method of claim 2 for performing initial testing of the system, wherein the programs stored in the system manager unit memory include programs for testing of the functional units of the data processing system and step 1 further comprises the step of:
   in the system manager, and responsive to successful completion of the system manager self test programs and to the programs for testing the functional units of the data processing system,
   1B) performing tests of elements of the system functional units which are accessible to the system manager through the system bus.

4. The method of claim 2 for performing initial testing of the system, wherein the programs stored in the system manager unit memory include control store load programs for controlling the loading of the testing microinstruction program and the operating microinstruction programs into the control store and wherein the loading of the control store with the testing microinstruction program of step 1 is controlled by the system manager operating in response to the control store load programs.

5. The method of claim 2 for performing initial testing of the system, wherein the programs stored in the system manager unit memory include central subsystem test management programs for directing the execution of the testing microinstruction program by the central subsystem and the execution of the testing microinstruction of step 2 is controlled by the system manager operating in response to the central subsystem test management programs.

6. The method of claim 2 for performing initial testing of the system, wherein the loading of the control store with the central subsystem operating microinstruction program is controlled by the system manager operating in response to the control store load programs.

* * * * *